United States Patent

Hori

[11] Patent Number: 5,615,034
[45] Date of Patent: Mar. 25, 1997

[54] OPTICAL MICRO CELL TRANSMISSION SYSTEM

[75] Inventor: Tsuguo Hori, Tokyo, Japan

[73] Assignee: NEC Corporation, Tokyo, Japan

[21] Appl. No.: 563,203

[22] Filed: Nov. 27, 1995

[30] Foreign Application Priority Data

Nov. 25, 1994 [JP] Japan .................................. 6-291300

[51] Int. Cl.$^6$ ................................................. H04B 10/08
[52] U.S. Cl. ............................ 359/110; 359/153; 379/59
[58] Field of Search ................................. 359/110, 143, 359/145, 146, 153, 161; 379/59

[56] References Cited

U.S. PATENT DOCUMENTS

| | | | |
|---|---|---|---|
| 5,150,243 | 9/1992 | Suzuki | 359/110 |
| 5,278,690 | 1/1994 | Vella-Coleiro | 359/152 |
| 5,301,056 | 4/1994 | O'Neill | 359/145 |
| 5,479,595 | 12/1995 | Israelsson | 354/145 |
| 5,493,436 | 2/1996 | Karasawa et al. | 359/145 |

FOREIGN PATENT DOCUMENTS

| | | |
|---|---|---|
| 63-257343 | 10/1988 | Japan . |
| 3-283725 | 12/1991 | Japan . |
| 4-35234 | 2/1992 | Japan . |
| 4-196629 | 7/1992 | Japan . |
| 4-246929 | 9/1992 | Japan . |

Primary Examiner—Mark Hellner
Attorney, Agent, or Firm—Young & Thompson

[57] ABSTRACT

An optical micro cell transmission system comprising a radio base station, at least one optical interface section connected to the radio base station, and an optical forward base station connected to the optical interface section via optical fibers for transmitting and receiving signals through an antenna, and being flexible for the variation of an amplifier due to a change in temperature or a change in the length of an optical segment, and also being available for detecting faults in the optical forward base station is provided. Pilot signal generators 30, 51 are provided for generating pilot signals. For a transmitted signal 11, a coupler 21 in the optical interface section convolutes a pilot signal $P_D$, and a demodulator 48 in an optical forward base station detects the level of the pilot signal $P_D$ and controls a downward signal amplifier 42 according to the result of detection. For a received signal received by an antenna 6, a coupler 45 in the optical forward base station convolutes a pilot signal $P_U$, a demodulator 27 in the optical interface section detects the level of the pilot signal $P_U$ and controls an upward signal amplifier 25 according to the result of detection. Furthermore, control signals and fault information signals are transmitted in a modulated signal for the pilot signals $P_D$, $P_U$.

7 Claims, 2 Drawing Sheets

OPTICAL MICRO CELL TRANSMISSION SYSTEM

BACKGROUND OF THE INVENTION

1. Field of the Invention

The present invention relates to a mobile communication system, and more particularly, to an optical micro cell transmission system in which the radio communication zone of a radio base station is divided into a plurality of micro cells, with each micro cell having an optical forward base station and the radio base station connected to the optical forward base stations via optical fibers.

2. Description of the Related Art

In a mobile communication system, the service area is divided into radio communication zones with each having a radio base station, and subscribers' terminals such as cellular telephones (portable telephones) communicating with the radio base station by radio channels. The radio base station is provided with several functions for processing a radio signal in a baseband, interfacing with a switching network for call handling, time division and space division processing in signal transmission, and call switching to a suitable radio channel, as well as providing a radio transmitter and receiver. Although each radio communication zone should be as small as possible for lower power consumption at subscribers' terminals and effective use of frequency resources, the service area divided into smaller radio communication zones results in an increase in the number of radio base stations, thereby increasing costs for constructing the radio base stations as well as required time and labor for maintaining them.

Thus, new optical micro cell transmission systems in which the radio communication zone of a radio base station is divided into a plurality of micro cells with each micro cell having an optical forward base station, and the radio base station connected to the optical forward base stations via optical fibers have been developed.

The optical forward base station does not have functions such as a processing a radio signal in a baseband, interfacing with switching networks, and call switching, but simply comprises a radio transmitting and receiving function. The optical micro cell transmission system is disclosed in, for example, Japanese Patent Laid Open No. 196629/92, No. 283725/91, No. 35234/92, and No. 246929/92. Since the optical forward base station can be inexpensively constructed in any location and its required maintenance is not difficult or time-consuming, the use of such an optical micro cell transmission system reduces the power consumption of subscribers' terminals and enables frequency resources to be effectively used without increasing costs.

FIG. 2 is a block diagram showing the configuration of a conventional optical micro cell transmission system.

A radio base station 51 has an optical interface section 52 connected thereto, and the optical interface section 52 is connected to an optical forward base station 53 via upward and downward optical fibers 56, 55.

The optical interface section 52 comprises a downward signal amplifier 61 for amplifying a downward transmitted signal 57 from the radio base station 51 to a specified level, an electricity-light (E/O) converter 62 for converting into an optical signal an electric signal amplified by the downward signal amplifier 61 and sending the signal out to the optical forward base station 53 via the optical fiber 55, a light-electricity (O/E) converter 63 for converting into an electric signal an optical signal transmitted from the optical forward base station 53 via the optical fiber 56, and an upward signal amplifier 64 for amplifying to a specified level the electric signal converted by the O/E converter 63 and outputting the signal to the radio base station 51 as an upward received signal 58.

The optical forward base station 53 has an antenna 54 connected thereto, and comprises a light-electricity (O/E) converter 65 for converting into an electric signal an optical signal input via the optical fiber 55, a downward signal amplifier 66 for amplifying the electric signal from the light-electricity (O/E) converter 65 to a specified output level and transmitting it from the antenna 54, an upward signal amplifier 68 for amplifying the received signal received by the antenna 54 according to a specified amplification degree, an electricity-light (E/O) converter 69 for converting from an electric signal into an optical signal the received signal amplified by the upward signal amplifier 68 and sending the signal out to the optical fiber 56, and a duplexer 67 for enabling the downward signal amplifier 66 and the upward signal amplifier 68 to share the antenna 54 by duplexing both directions of the signals.

The downward transmitted signal 57 from the radio base station 51 is input to the optical interface section 52, amplified to a specified level by the downward signal amplifier 61, and converted into an optical signal by the E/O converter 62. The optical signal is then sent out to the optical fiber 55. The optical signal sent to the optical fiber 55 is then input to the optical forward base station 53, and converted back into an electric signal by the O/E converter 65. The electric signal is subsequently amplified to a specified output level by the downward signal amplifier 66, and sent to subscribers' terminals (not shown) from the antenna 54 via the duplexer 67.

On the other hand, the received signal received from a subscriber's terminals by the antenna 54 is input to the upward signal amplifier 68 via the duplexer 67, amplified according to a specified amplification level, converted into an optical signal by the E/O converter 69, and sent out to the optical fiber 56. The optical signal sent out to the optical fiber 56 is then input to the optical interface section 52, converted back into an electric signal by the O/E converter 63, and amplified by the upward signal amplifier 64 according to a specified amplification degree. The signal is finally output to the radio base station 51 as an upward received signal 58.

In the optical micro cell transmission system, not only the level of transmission output from the antenna 54 but also the amplification degree for the received signal received by the antenna 54 and amplified before transmission from the antenna 54 to the radio base station 51 must be maintained at fixed values. The variation of the amplification degree for each amplifier due to a change in temperature must also be minimized. A constant amplification degree for the received signal must be maintained because the radio base station 51 traces the location of a subscriber's terminal according to the intensity of the received signal. Although in some cases, the optical output of the E/O converter has been controlled using, for example, the control method disclosed in Japanese Patent Laid Open No. 257343/88, it is difficult to avoid the effects of the variation of the amplification degree for the amplifier simply by controlling the optical output, and the downward transmission output level and the upward received signal amplification degree may be varied if the length of an optical segment (the optical fiber) is changed when that optical fiber is replaced or the optical forward base station is relocated. Furthermore, conventional optical micro cell transmission systems are disadvantageous in that they cannot detect faults in optical forward base stations located far apart from the radio base station.

SUMMARY OF THE INVENTION

It is an object of the present invention to provide an optical micro cell transmission system that can deal with the variation of an amplifier due to a change in temperature and a change in the length of an optical segment and that can detect faults in the optical forward base station.

An optical micro cell transmission system according to the present invention comprises a radio base station, at least one optical interface section connected to the radio base station, and an optical forward base station connected to the optical interface section via optical fibers for transmitting and receiving signals through an antenna.

The optical micro cell transmission system of the present invention comprises a first pilot signal convolution means in the optical interface section for convoluting a downward transmitted signal from the radio base station with a first pilot signal; a first control means in the optical forward base station for detecting the variation of the level of the first pilot signal to control signal level of the transmitted signal to be output from the optical forward base station; a second pilot signal convolution means in the optical forward base station for convoluting a received signal received by the antenna with a second pilot signal; and a second control means in the optical interface section for detecting the variation of the level of the second pilot signal to control signal level of the upward received signal to be output to the radio base station.

In the present invention, the first control means may comprise a first variable amplifier, the amplification degree for which is controlled by a first amplification degree control signal for amplifying signals from the optical interface section, a first branching device installed at the output of the first variable amplifier for distributing an input signal to the transmitted signal to be output through the antenna and the first pilot signal, a first detection means for detecting the level of the first pilot signal distributed from the first branching device, and a first controller for comparing the level of the detected first pilot signal to a first predetermined value to output the first amplification degree control signal, and the second control means may comprise a second variable amplifier the amplification degree for which is controlled by a second amplification degree control signal for amplifying signals from the optical forward base station, a second branching device installed at the output of the second variable amplifier for distributing an input signal to the received signal to be transferred to the radio base station and the second pilot signal, a second detection means for detecting the level of the second pilot signal distributed from the second branching device, and a second controllers for comparing the level of the detected second pilot signal to a second predetermined value to output the second amplification degree control signal.

In addition, the first pilot signal convolution means may comprise a first pilot signal generator for generating first pilot signals and a first coupler for coupling the first pilot signal to a downward transmitted signal from the radio base station, and the second pilot signal convolution means may comprise a second pilot signal generator for generating second pilot signals and a second coupler for coupling the second pilot signal to a received signal from the antenna.

Furthermore, the system may further include a first modulator connected to the first pilot signal generator for carrying out modulation according to control signals from the second controller; and a second modulator connected to the second pilot signal generator for carrying out modulation according to state signals from the first controller.

In this case, the first detection means may comprise a first demodulator for demodulating the first pilot signal and detecting the signal level; the second detection means may comprise a second demodulator for demodulating the second pilot signal and detecting the signal level; the first controller may control the optical forward base station according to modulated data from the first modulator, and upon detecting a fault in the optical forward base station, generate a state signal; and the second controller may generate a control signal to control the optical forward base station and detect faults in the optical forward base station according to the modulated data from the first modulator to send out a alarm signal to the radio base station.

Since the pilot signal is convoluted and its level is monitored so as to control the amplification degree for variable amplifiers according to the results of monitoring, a fixed transmission output level and a constant amplification degree for upward received signals can be maintained even if a characteristic (the amplification degree) of an amplifier or a converter is changed. In this case, integral control is provided for the system including the optical segment, so a change in the length of the optical segment can be dealt with easily, and fixed transmission output and reception amplification degree can be maintained. Furthermore, since the pilot signal is modulated by control or state signals, optical forward base stations located far away from the radio base station can be controlled and faults therein can thus be detected.

DETAILED DESCRIPTION OF THE PREFERRED EMBODIMENTS

Figure 1:
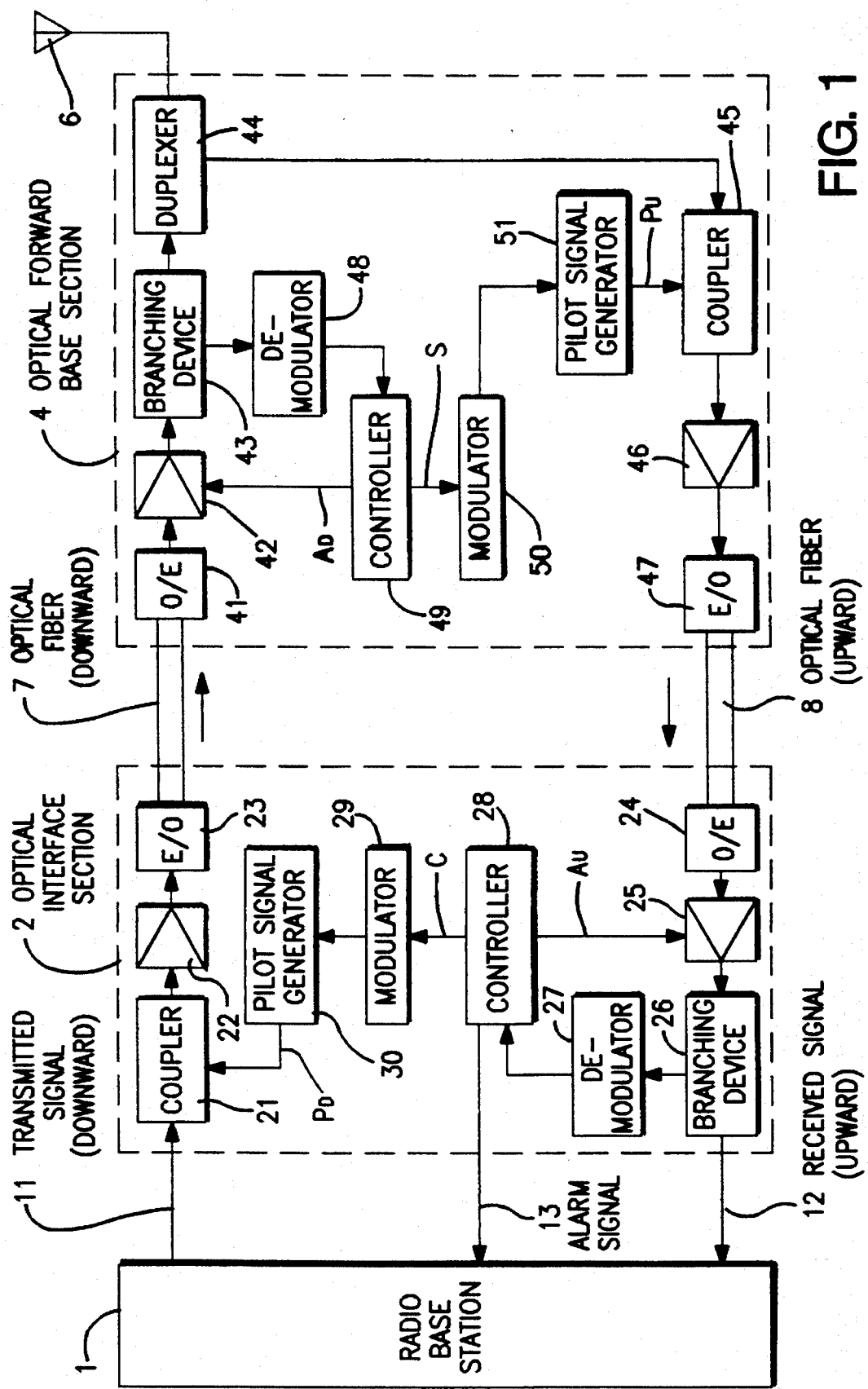
FIG. 1 is a block diagram describing an optical micro cell transmission system according to one embodiment of this invention.
Figure 2:
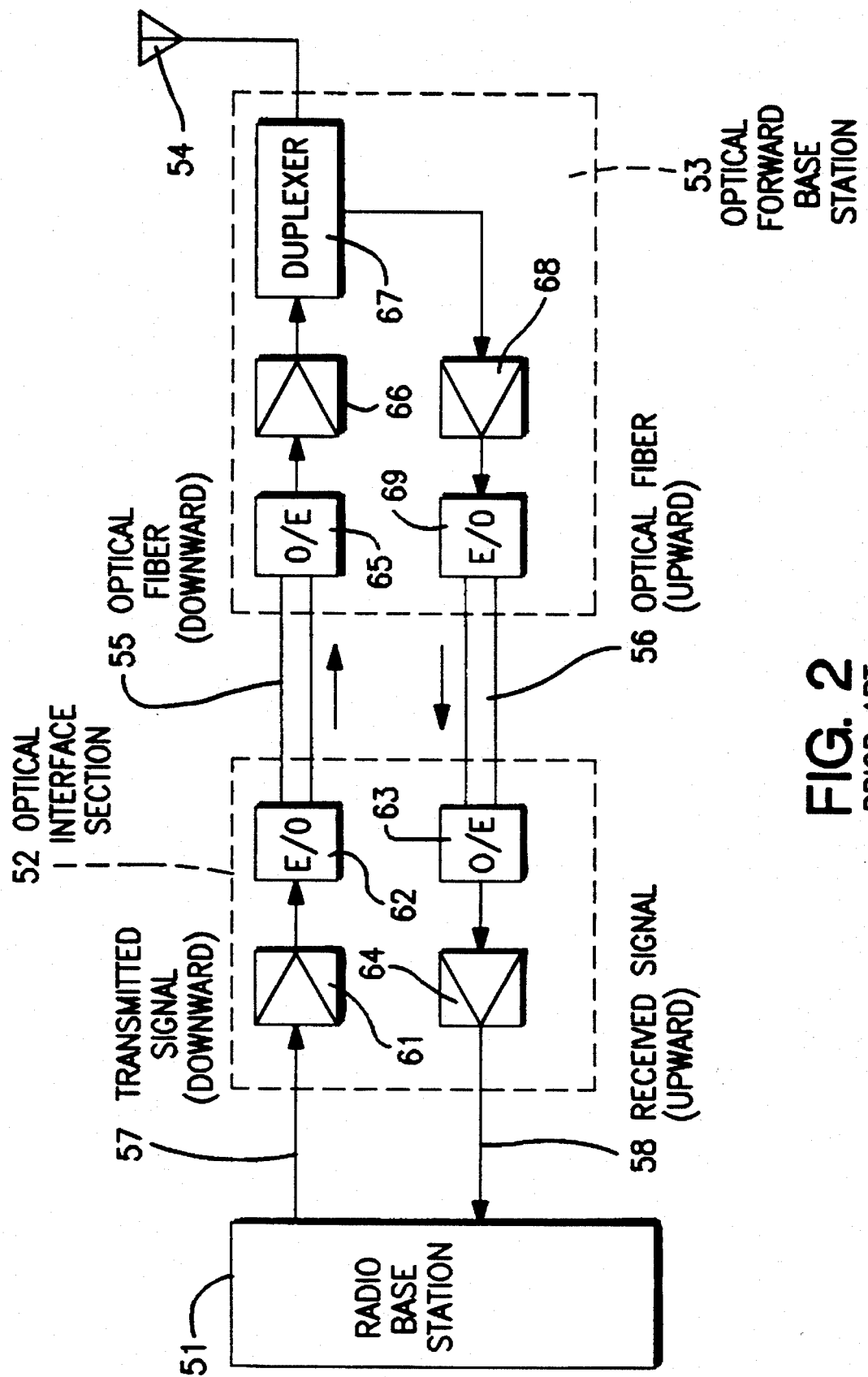
FIG. 2 is a block diagram describing a conventional optical micro cell transmission system.

The present invention will be described below with reference to the attached drawings. FIG. 1 is a block diagram showing the configuration of an optical micro cell transmission system according to one embodiment of the present invention.

A radio base station 1 has an optical interface section 2 connected thereto, with the optical interface section 2 connected to an optical forward base station 4 via upward and downward fibers 8, 9. Although not shown, the radio base station 1 can have a plurality of optical interface sections 2 connected thereto, and a single radio base station 1 can thus accommodate a plurality of optical forward base stations 4.

The optical interface section 2 has a coupler 21 for coupling a downward transmitted signal 11 from the radio base station 1 to a pilot signal $P_D$ described below, a downward signal amplifier 22 for amplifying a signal from the coupler 21 according to a predetermined amplification degree, an electricity-light (E/O) converter 23 for converting into an optical signal an electric signal output from the downward signal amplifier 22 and sending the signal out to the optical forward base station 4 via an optical fiber 7, a light-electricity (O/E) converter 24 for converting into an electric signal the optical signal input from the optical forward base station 4 via the optical fiber 8, an upward signal amplifier 25 the amplification degree for which is controlled by an amplification degree control signal $A_U$ described below so as to amplify the output signal from the O/E converter 24, and a branching device 26 for branching the output of the upward signal amplifier 25. One output of the branching device 26 is input to the radio base station 1 as an upward received signal 12. The optical interface section 2 has a demodulator 27 connected to the other output port of the branching device 26 for detecting the absolute level of an upward pilot signal $P_U$ from the optical forward base station 4 and demodulating the signal, a controller 28 to which the output of the demodulator 27 is input, a modulator 29 for carrying out modulation according to a control signal C from the controller 28, and a pilot signal generator 30 to which the output of the modulator 29 is input in order to generate a downward pilot signal PD and which inputs the pilot signal $P_D$ to the coupler 21. The downward pilot signal $P_D$ is assigned to a frequency channel differing from the frequency channel for the downward transmitted signal 11.

The controller 28 outputs the amplification degree control signal $A_U$ to the upward signal amplifier 25 to adjust the absolute level of the upward pilot signal $P_U$ detected by the demodulator 27 to a specified value. It detects faults in the optical forward base station 4 according to demodulated data from the demodulator 27, and upon detecting a fault, outputs an alarm signal 13 to the radio base station 1. It further generates a control signal C and outputs it to the modulator 29 in order to control the optical forward base station 4.

The optical forward base station 4 has the antenna 6 connected thereto, and has a duplexer 44 for allowing the antenna 6 to be commonly used by the transmission signal and the receiving signal. The optical forward base station 4 has a light-electricity (O/E) converter 41 for converting into an electric signal an optical signal input via the optical fiber 7, a downward signal amplifier 42 the amplification degree for which is controlled by an amplification degree control signal $A_D$ described below so as to amplify the output signal from the light-electricity (O/E) converter 41, a branching device 43 provided at the output of the downward signal amplifier 43 and one output port of which is connected to the transmit port of the duplexer 44, a coupler 45 for coupling a received signal from the receive port of the duplexer 44 to the upward pilot signal $P_U$, an upward signal amplifier 46 for amplifying the output of the coupler 45 according to a constant amplification degree, and an electricity-light (E/O) converter 47 for converting into an optical signal an electric signal output by the upward signal amplifier 46 and sending the optical signal out to the optical fiber 8. It also has a demodulator 48 connected at the other output port of the branching device 43 for detecting the absolute level of the downward pilot signal $P_D$ and demodulating the pilot signal $P_D$, a controller 49 provided at the output of the demodulator 48, a modulator 50 for executing modulation according to a state signal S from the controller 49, and a pilot signal generator 51 to which the output of the modulator 50 is input in order to generate an upward pilot signal $P_U$ and which inputs the pilot signal $P_U$ to the coupler 45. The upward pilot signal $P_U$ is assigned to a frequency channel differing from the frequency channel for the upward transmitted signal 12.

The controller 49 controls and detects the entire operation state of the optical forward base station 4 and outputs the amplification degree control signal $A_D$ to the downward signal amplifier 42 to adjust the absolute level of the downward pilot signal $P_D$ detected by the demodulator 48 to a specified value. The controller 49 controls the operation of each section of the optical forward base station 4 according to demodulated data from the demodulator 27, and upon detecting a fault in the optical forward base station 4, generates a state signal S to output it to the modulator 50.

Next, the operation of the optical micro cell transmission system of the present invention will be explained.

The downward transmitted signal 11 input to the optical interface section 2 from the radio base station 1 is convoluted with the downward pilot signal $P_D$ by the coupler 21, amplified by the downward signal amplifier 22 according to a constant amplification degree, and then converted into an optical signal by the E/O converter 23. The optical signal is subsequently transmitted to the optical forward base station 4 via the optical fiber 7. The optical signal input to the optical forward base station 4 is converted back into an electric signal by the O/E converter 41, amplified by the downward signal amplifier 42, and input to the branching device 43. The branching device 43 distributes the input signal and outputs the downward transmitted signal 11 to the duplexer 44, and the downward pilot signal $P_D$ to the demodulator 48 in a predetermined signal coupling ratio. The duplexer 44 is so arranged as to attenuate the downward pilot signal $P_D$ having a frequency channel differing from the frequency channel for the downward transmitted signal 11, thereby causing only the downward transmitted signal to be sent from the antenna 6 to subscribers' terminals (portable terminals) and preventing the downward pilot signal $P_D$ from being transmitted.

The demodulator 48 demodulates modulated downward pilot signal $P_D$ and detects the absolute level of the downward pilot signal $P_D$, and transmits an absolute level value and demodulated data to the controller 49. The controller 49 compares the level of the downward pilot signal $P_D$ to a specified value to determine whether or not they coincide with each other, and if not, generates the amplification degree control signal $A_D$ to control the amplification degree of the downward signal amplifier 42 in order to maintain a specified signal level to be output. As a result, by allowing the pilot signal generator 30 of the optical interface section 2 to generate a pilot signal $P_D$ of a predetermined level, a constant signal level for transmission can be maintained even if the length of the optical fiber 7 or the amplification degree for each amplifier or converter is changed.

On the other hand, the received signal from a subscriber's terminal by the antenna 6 is input to the coupler 45 via the duplexer 44, convoluted with the upward pilot signal $P_U$, and then amplified by the upward signal amplifier 46 according to a predetermined amplification degree.

The signal is subsequently converted into an optical signal by the E/O converter 48, and transmitted to the optical interface section 2 via the optical fiber 8. The optical signal input to the optical interface section 2 is converted back into an electric signal by the O/E converter 24, amplified by the upward signal amplifier 25, and then input to the branching device 26. The branching device 26 outputs one type of signal to the radio base station 1 as the upward received signal 12, and another type of signal to the demodulator 27 as the upward pilot signal $P_U$ in a predetermined signal coupling ratio.

The demodulator 27 demodulates modulated upward pilot signal $P_U$ and detects the absolute level of the upward pilot signal $P_U$, and sends the absolute level value of the upward pilot signal and demodulated data to the controller 28. The controller 28 compares the level value of the upward pilot signal $P_U$ to a specified value to determine whether or not they are coincide with each other, and if not, generates the amplification degree control signal $A_U$ to the upward signal amplifier 25 to control the amplification degree in order to maintain a detected level of the upward pilot signal $P_U$ to be constant. As a result, by allowing the pilot signal generator 51 of the optical forward base station 4 to generate a pilot signal $P_U$ of a predetermined level, a constant amplification degree of the received signal is maintained from the input of the antenna 6 to the output of the optical interface section 2 (the input of the radio base station 1) even if the length of the optical fiber 7 or the amplification degree for each amplifier or converter is changed.

The optical micro cell transmission system according to the present invention can also provide a controlling function from the optical interface section 2 to the optical forward base station 4 and a detecting function of faults in the optical forward base station 4 at the optical interface section 2. These operations will be described below.

The downward pilot signal $P_D$ generated by the pilot signal generator 30 of the optical interface section 2 is modulated by the modulator 29 according to the control signal C from the controller 28. The downward pilot signal $P_D$ thus modulated by the control signal C is convoluted with the downward transmitted signal 11, input to the optical forward base station 4, and demodulated by the demodulator 48. The control signal C is then input to the controller 49 as demodulated data. The controller 49 controls each section within the optical forward base station 4 based on the demodulated data of the control signal C (for example, changing the transmission output level and turning on and off the transmission output).

If there is a fault in any section within the optical forward base station 4, this information is collected by the controller 49, which then generates a state signal S based on the fault information. The state signal S is sent to the modulator 50, and an upward pilot signal $P_U$ is generated by the pilot signal generator 51 after modulation by this signal S. The upward pilot signal $P_U$ is convoluted with the received signal, transmitted to the optical interface section 2, and demodulated by the demodulator 27. The state signal S is then sent to the controller 29 as demodulated data. The controller 29 analyzes this demodulated data of the state signal S to detect faults in the optical forward base station 4, and upon detecting a fault, sends an alarm signal 13 out to the radio base station 1 to inform it of the fault.

As described above, the present invention can maintain a fixed downward transmission output level and a constant amplification degrees for upward received signals even if a characteristic of a variable amplifier is significantly changed due to a change in temperature, by convoluting the pilot signal to detect its level in order to control the amplification degree for amplifiers. The present invention can thus absorb changes in characteristics of an amplifier due to a change in temperature compared to conventional optical micro cell transmission systems, so it enables the use of inexpensive amplifiers whose allowance of characteristics are of a relatively low degree. In addition, since control is provided for optical segments and a plurality of amplifiers including light-electricity and electricity-light converters, a change in the length of an optical segment (the optical fiber segment) can be dealt with easily, and fixed transmission output and receive amplification degrees can be maintained. Furthermore, the modulation of the pilot signal by the control signal or the state signal before transmission enables the control of optical forward base stations located far away from the radio base station and the detection of faults in these optical forward base stations.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. An optical micro cell transmission system comprising:

a radio base station;

at least one optical interface section connected to said radio base station;

an optical forward base station connected to said optical interface section via an optical fiber and connected to an antenna;

a first pilot signal mixing means in said optical interface section for mixing a downward transmitted signal from said radio base station with a first pilot signal generated in said optical interface section, thereby producing a first mixed signal, and transmitting said first mixed signal to said optical forward base station;

a first signal adjusting means in said optical forward base station for receiving and amplifying said first mixed signal from said optical interface section, and for separating said first pilot signal from said downward transmitted signal to be transmitted through said antenna from said first mixed signal;

a first control means in said optical forward base station for measuring a level of said separated first pilot signal, and for controlling said first signal adjusting means to adjust amplification of said first mixed signal with reference to the measured level of said first pilot signal;

a second pilot signal mixing means in said optical forward base station for mixing an upward transmitted signal received from said antenna with a second pilot signal generated in said optical forward base station, thereby producing a second mixed signal, and transmitting said second mixed signal to said optical interface section;

a second signal adjusting means in said optical interface section for receiving and amplifying said second mixed signal from said optical forward base station, and for separating said second pilot signal from said upward transmitted signal to be transmitted to said radio base station from said second mixed signal; and a second control means in said optical interface section for measuring a level of said separated second pilot signal, and for controlling said second signal adjusting means to adjust amplification of said second mixed signal with reference to the measured level of said second pilot signal.

2. An optical micro cell transmission system including a radio base station, at least one optical interface section connected to said radio base station, and optical forward base station connected to said optical interface section via an optical fiber and to which an antenna is connected, said optical micro cell transmission system comprising:

a first pilot signal convolution means installed in said optical interface section for convoluting a downward transmitted signal from said radio base station with a first pilot signal, comprising;
  a first pilot signal generator for generating said first pilot signal; and
  a first coupler for coupling said first pilot signal to said downward transmitted signal from said radio base station;

a first control means installed in said optical forward base station for detecting the variation of the level of said first pilot signal to control a signal level of the transmitted signal to be output from said optical forward base station, comprising;

a first variable amplifier the amplification degree for which is controlled by a first amplification degree control signal for amplifying signals from said optical interface section;

a first branching device installed at the output of said first variable amplifier for obtaining said first pilot signal;

a first detection means for detecting the level of said first pilot signal obtained from said first branching device; and a first controller for comparing the level of said detected first pilot signal to a first predetermined value to output said first amplification degree control signal;

a second pilot signal convolution means installed in said optical forward base station for convoluting a received signal received by said antenna with a second pilot signal, comprising;

a second pilot signal generator for generating second pilot signal; and a second coupler for coupling said second pilot signal to said received signal from said antenna; and a second control means installed in said optical interface section for detecting the variation of the level of said second pilot signal to control a signal level of the upward received signal to be output to said radio base station, comprising;

a second variable amplifier the amplification degree for which is controlled by a second amplification degree control signal for amplifying signals from said optical forward base station;

a second branching device installed at the output of said second variable amplifier for obtaining said second pilot signal;

a second detection means for detecting the level of said second pilot signal obtained from said second branching device; and a second controller for comparing the level of said detected second pilot signal to a second predetermined value to output said second amplification degree control signal.

3. An optical micro cell transmission system according to claim 2 wherein, said first pilot signal convolution means further comprising:

a first modulator connected to said first pilot signal generator for modulating control signals to be transmitted to said optical forward base station from said second controller with said first pilot signal; and said first detection means further comprising:

a first demodulator for demodulating said first pilot signal, detecting signal level of said first pilot signal and extracting control signals for controlling said optical forward base station by said first controller.

4. An optical micro cell transmission system according to claim 2 wherein, said second pilot signal convolution means further comprising:

a second modulator connected to said second pilot signal generator for modulating fault signals to be transmitted to said optical interface section from said first controller with said second pilot signal; and said second detection means further comprising:

a second demodulator for demodulating said second pilot signal, detecting signal level of said second pilot signal and extracting fault signals of said optical forward base station for informing a fault state by said second controller.

5. An optical micro cell transmission system including a radio base station, at least one optical interface section connected to said radio base station, and optical forward base station connected to said optical interface section via an optical fiber and to which an antenna is connected, said optical micro cell transmission system comprising:

a first pilot signal convolution means installed in said optical interface section comprising;

a first pilot signal generator for generating a first pilot signal;

a first coupler for coupling said first pilot signal to a downward transmitted signal from said radio base station; and a first modulator connected to said first pilot signal generator for modulating control signals to be transmitted to said optical forward base station from a second controller with said first pilot signal;

a first control means installed in said optical forward base station comprising;

a first variable amplifier the amplification degree for which is controlled by a first amplification degree control signal for amplifying signals from said optical interface section;

a first branching device installed at the output of said first variable amplifier for distributing input signals to said first pilot signal and transmitted signals to be output through said antenna;

a first demodulator for demodulating said first pilot signal obtained from said first branching device, detecting signal level of said first pilot signal and extracting control signals; and a first controller for comparing the level of said detected first pilot signal to a first predetermined value to output said first amplification degree control signal, and controlling said optical forward base station by said extracted control signals;

a second pilot signal convolution means installed in said optical forward base station comprising;

a second pilot signal generator for generating a second pilot signal;

a second coupler for coupling said second pilot signal to a received signal from said antenna; and a second modulator connected to said second pilot signal generator for modulating fault signals to be transmitted to said optical interface section from said first controller with said second pilot signal; and a second control means installed in said optical interface section comprising;

a second variable amplifier the amplification degree for which is controlled by a second amplification degree control signal for amplifying signals from said optical forward base station to said radio base station;

a second branching device installed at the output of said second variable amplifier for distributing input signals to said second pilot signal and said received signal to be output to said radio base station;

a second demodulator for demodulating said second pilot signal, detecting signal level of said second pilot signal obtained from said second branching device and extracting fault signals of said optical forward base stations; and a second controller for comparing the level of said detected second pilot signal to a second predetermined value to output said second amplification degree control signal, and informing a fault state of said optical forward base station to said radio base station in accordance with said extracted fault signals.

6. An optical micro cell transmission system comprising:

a radio base station;

at least one optical interface section connected to said radio base station;

an optical forward base station connected to said optical interface section via an optical fiber and connected to an antenna;

a first pilot signal mixing means in said optical interface section for mixing a downward transmitted signal from said radio base station with a first pilot signal;

a first control means in said optical forward base station for detecting a variation of a level of said first pilot signal to control a signal level of the transmitted signal to be output from said optical forward base station; said first control means including: a first variable amplifier, an amplification degree for which controlled by a first amplification degree control signal for amplifying signals from said optical interface section; a first branching device at the output of said first variable amplifier for obtaining said first pilot signal; a first detection means for detecting the level of said first pilot signal obtained from said first branching device; and a first controller for comparing the level of said detected first pilot signal to a first predetermined value to output said first amplification degree control signal;

a second pilot signal mixing means in said optical forward base station for mixing a received signal received by said antenna with a second pilot signal; and a second control means in said optical interface section for detecting a variation of a level of said second pilot signal to control a signal level of the upward received signal to be output to said radio base station, said second control means including: a second variable amplifier, an amplification degree for which controlled by a second amplification degree control signal for amplifying signals from said optical forward base station; a second branching device at the output of said second variable amplifier for obtaining said second pilot signal; a second detection means for detecting the level of said second pilot signal obtained from said second branching device; and a second controller for comparing the level of said detected second pilot signal to a second predetermined value to output said second amplification degree control signal.

7. An optical micro cell transmission system comprising:

a radio base station;

at least one optical interface section connected to said radio base station;

an optical forward base station connected to said optical interface section via an optical fiber and connected to an antenna;

a first pilot signal mixing means in said optical interface section for mixing a downward transmitted signal from said radio base station with a first pilot signal, said first pilot signal mixing means including: a first pilot signal generator for generating first pilot signal; a first coupler for coupling said first pilot signal to said downward transmitted signal from said radio base station;

a first control means in said optical forward base station for detecting a variation of a level of said first pilot signal to control a signal level of the transmitted signal to be output from said optical forward base station;

a second pilot signal mixing means in said optical forward base station for mixing a received signal received by said antenna with a second pilot signal, and said second pilot signal mixing means including: a second pilot signal generator for generating second pilot signal; and a second coupler for coupling said second pilot signal to said received signal from said antenna;

a second control means in said optical interface section for detecting a variation of a level of said second pilot signal to control a signal level of the upward received signal to be output to said radio base station.

* * * * *